United States Patent
Andersen et al.

(10) Patent No.: US 12,516,259 B2
(45) Date of Patent: Jan. 6, 2026

(54) RENEWABLE MARINE FUEL AND METHOD OF PRODUCTION

(71) Applicant: Topsoe A/S, Kgs. Lyngby (DK)

(72) Inventors: Stefan Andersen, Værløse (DK); Magnus Zingler Stummann, Copenhagen (DK); Asad Navid, Skovlunde (DK)

(73) Assignee: TOPSOE A/S, Kgs. Lyngby (DK)

( * ) Notice: Subject to any disclaimer, the term of this patent is extended or adjusted under 35 U.S.C. 154(b) by 0 days.

(21) Appl. No.: 18/838,121

(22) PCT Filed: Mar. 7, 2023

(86) PCT No.: PCT/EP2023/055700
§ 371 (c)(1),
(2) Date: Aug. 13, 2024

(87) PCT Pub. No.: WO2023/170039
PCT Pub. Date: Sep. 14, 2023

(65) Prior Publication Data
US 2025/0145900 A1     May 8, 2025

(30) Foreign Application Priority Data
Mar. 7, 2022   (EP) .................................... 22160562

(51) Int. Cl.
*C10L 1/02*           (2006.01)
(52) U.S. Cl.
CPC ........... *C10L 1/02* (2013.01); *C10L 2270/026* (2013.01); *C10L 2290/02* (2013.01)
(58) Field of Classification Search
CPC ... C10L 1/02; C10L 2270/026; C10L 2290/02
See application file for complete search history.

(56) References Cited

U.S. PATENT DOCUMENTS

| | | | |
|---|---|---|---|
| 2010/0005706 A1* | 1/2010 | Burgazli ................ | C10L 1/026 44/308 |
| 2012/0204481 A1 | 8/2012 | Corredores | |
| 2014/0123662 A1* | 5/2014 | Ramirez Corredores ................ | C10G 3/44 44/307 |
| 2021/0062098 A1* | 3/2021 | Iversen ................ | C10G 65/04 |

FOREIGN PATENT DOCUMENTS

| WO | 2020228990 A1 | 11/2020 |
| WO | 2020228991 A1 | 11/2020 |

OTHER PUBLICATIONS

Clariant, "Dipropylene glycol DME Technical Datasheet", Jul. 2007, retrieved from the internet at https://atamankimya.com/Assets/Documents/Dipropyleneglycol_DME_ataman_kimya_20201026_194707.pdf on May 19, 2025 (Year: 2007).*
International Search Report mailed on Apr. 5, 2023, by the European Patent Office for International Application No. PCT/EP2023/055700, 5 Pages.
European Search Report mailed on Aug. 19, 2022 by the European Patent and Trademark Office for European Application No. 22160562.9, 6 Pages.
Written Opinion mailed on Apr. 5, 2023, by the European Patent Office for International Application No. PCT/EP2023/055700, 9 Pages.
Santhakumari Sivasubramanian et al: "In vitro and in vivo effect of 2,6-Di-tert-butyl-4-methylphenol as an antibiofilm agent against quorum sensing mediated biofilm formation of *Vibrio* spp.", International Journal of Food Microbiology, vol. 281, Sep. 1, 2018 (Sep. 1, 2018), pp. 60-71.
Sylvain Verdier, et al "Pilot-scale Hydrotreating of Catalytic Fast Pyrolysis Biocrudes: Process Performance and Product Analysis" Royal Society of Chemistry 2021, published Aug. 12, 2021, 12 pages.
European Patent Office Communication Pursuant to Rules 161 in Application No. 23708255.7 dated Oct. 15, 2024, 3 pages.

* cited by examiner

*Primary Examiner* — James C Goloboy
(74) *Attorney, Agent, or Firm* — Boone IP Law

(57) ABSTRACT

The present invention relates to a composition comprising, on water free basis, at least 80 wt % molecules comprising from 8 to 35 C-atoms, said composition having a flash point above 60° C. and comprising, on water free basis, 9.5-12 wt % H, 3-45 wt % O and less than 5 wt ppm halogens, the use of such a composition as a marine fuel and a process for producing such a composition by partial hydrodeoxygenation.

20 Claims, No Drawings

RENEWABLE MARINE FUEL AND METHOD OF PRODUCTION

TECHNICAL FIELD

The present application relates to an economically favorable provision of a suitable transportation fuel for use in heavy marine engines.

BACKGROUND ART

Provision of transportation fuel from crude fossil sources or renewable hydrocarbon sources commonly requires upgrading of the feedstock to ensure compliance with environmental standards. Such upgrading is related to financial capital and operational cost, and may include a loss of hydrocarbons.

For transportation fuels trading is often regulated by commercial standards, which are commonly designed to ensure that the fuels can be functioning with high quality in the relevant application. If the fuel is to be traded, this will imply a wide range of engines and operational conditions are met, but if the fuel is to be used in a specific type of engine for a specific purpose, the standard may be more restrictive than required. Such overly restrictive standards may involve a financial and an environmental cost, without providing an actual benefit.

One example of the conversion of solid biomass to liquid has been described in US 2012/0204481 A1, where catalytic pyrolysis is described with focus on producing a thermally stable product, with no or low increase in viscosity with time. Experimental data does not analyze corrosivity of the product, but it is reported that if the total acidity number (TAN) is above 36 mg KOH/g or the water content is above 7 wt % the product is thermally unstable.

Another examples is WO 2020/228991 in which solid biomass is converted to liquid by hydrothermal liquefaction. Here focus is on obtaining miscibility with non-polar fossil oil, and this is obtained by partial upgrade by hydrotreatment. To obtain satisfactory miscibility the least upgraded oil is reported to have TAN of 14.7 mg KOH/g and an oxygen content of 0.6 wt %.

It is therefore desirable to investigate the balance between cost and benefit, by reviewing the specific requirements and the related costs, in order to identify the extent of upgrading, which is required to meet the actual requirements.

SUMMARY OF INVENTION

A novel fuel is described together with a method of production for this fuel. The novel fuel has a non-corrosive content of acids but comprises an amount of oxygen which simplifies production and reduces the hydrogen consumption and other costs of production.

Definitions

In the following a hydrocarbonaceous feedstock shall be used to signify a feedstock rich in molecules comprising hydrogen and carbon, but possibly also heteroatoms, i.e. other elements, such as oxygen, sulfur and nitrogen.

A material catalytically active in a chemical reaction such as hydrodeoxygenation or hydrocracking shall be understood as a material having significant catalytic activity and preference for said chemical reaction under the conditions used. As it will be realised by the skilled person, most reactions will show an amount of side reactions, but unless otherwise specified the term a material catalytically active in a chemical reaction shall be understood as a combination of a material and conditions under which a commercially relevant amount of conversion takes place with higher selectivity than any other chemical reaction.

For the purpose of the present application, the unit wt % shall designate weight/weight % and the unit vol % shall designate volume/volume %. Similarly $ppm_{wt}$ refers to parts per million on weight basis.

The term aromatic molecule shall for the purpose of the present application be used to signify homocyclics, comprising only carbon atoms in the aromatic ring, as well as heterocyclics, comprising other atoms than carbon, such as oxygen and nitrogen. The term shall also cover both monocyclics and polycyclics, including fused aromatics.

The aromatic content of a liquid is in accordance with the art the total mass of molecules having at least one aromatic structure, relative to the total mass of all molecules in %.

As used herein, the term "thermochemical decomposition" shall for convenience be used broadly for any decomposition process, in which a material is partially decomposed at elevated temperature (typically 250° C. to 800° C. or even 1000° C.), in the presence of substoichiometric amount of oxygen (including no oxygen). The product will typically be a combined liquid and gaseous stream, as well as an amount of solid char. The term shall be construed to include processes known as pyrolysis and hydrothermal liquefaction, both in the presence and absence of a catalyst.

The content of compositions is determined on water free basis and unless stated otherwise, determined based on ASTM methods. Organic halogen content, such as fluoride and chloride are determined according to ASTM D 7359 and hydrogen is determined according to ASTM D 7171. Carbon is determined by direct temperature programmed desorption with a Unicube elemental analyzer and oxygen is determined by pyrolytic conversion with a Rapid Oxy Cube elemental analyzer both from Elementar. Total acidity number (TAN), is determined by titration according to ASTM D664. Carboxylic acid number (CAN), is determined by titration according to the Laboratory Analytical Procedure of NREL/TP-5100-65890.

Technical Problem

To minimize the $CO_2$ emission from the marine industry, a change from petroleum based marine fuels to renewable marine fuels is desired. In the long term synthesized fuels produced from electrolytic hydrogen, are likely to be preferred, but to ensure an option for short-term change and use in existing engines, cost-efficient alternatives are desired.

Traditionally the heavy marine fuels have been so-called bunker fuel with little or no specification. To minimize the environmental effects emission regulations have been introduced, and although the regulations mainly relates to the emission from the marine vessel and not the use of a specific fuel, the commercial trading has involved fuel specifications under the ISO standard 8217, such as the ISO-F-RMK-700 fuel specification for marine residual fuels, which has been written from a petroleum fuel perspective.

In the following, key parameters of the ISO-F-RMK-700 fuel specification are reviewed. Some parameters are defined out of concern for the value of the fuel from the perspective of fuel conversion efficiency, some are made out of environmental concern and finally some ensure safe fuel transport and engine operation.

Especially the fuel conversion efficiency in the engine may be dispensated if the cost of meeting the specification exceeds the value, and similarly new specifications may be of relevance. As an example, oxygen is not regulated under ISO-F-RMK-700, since fossil fuel does not contain oxygen in significant amounts, but for renewable fuels, especially when originating for biomass, oxygen is the major heteroatom, and the presence of oxygen in the fuel will reduce the energy content and thus the fuel conversion efficiency on a mass basis, but at the same time, reducing the amount of oxygen in renewable feedstock will require replacing oxygen with hydrogen which may not be the optimal balance between cost and fuel conversion efficiency.

The presence of oxygen in the fuel may be related to many different chemical compounds, including alcohols, aldehydes and acids. The acids are critical for engine operation, since a high acid level may cause corrosion e.g. in the engine and fuel lines, and thus ISO-F-RMK-700 includes a limit of total acidity number, as determined by ASTM D664, TAN, of 2.5 mg KOH/g. The acids present in fossil fuels are mainly naphthenic acids which have a $pK_a$ around 4.9, which is sufficiently low to impose some corrosion. However, TAN according to ASTM D664 does not distinguish between the $pK_a$ of the acids. This means that for feedstocks with high concentrations of non-aggressive acidic compounds such as phenols, alcohols and ketones, with high $pK_a$, the TAN value may still be high, without affecting corrosion.

An alternative measure of acidity is the "strong acid number" in which the amount of KOH added before pH reaches 4 is measured. This detects the very strong acids, mainly inorganic acids, and the presence of such strong acids is unwanted or even unacceptable. To appropriately reflect the quality of the fuel, a measure of acidity, considering the $pK_a$ of moderately corrosive acids will be more appropriate. We propose this measure to be a measure distinguishing the amount of KOH required to neutralize acids below a certain $pK_a$, but equivalent measures may also be based on other analytical methods. The scope of the present claims, shall be considered defined by whether the chemical nature of a product falls under the claim, not whether the product specifications and testing methods are defined in the same language as the claim. For convenience we will use the terminology intermediate acid number, IAN, for this parameter, and possibly $IAN_{pKa=7}$ to signify intermediate acid number with $pK_a=7$ as the defining limit. The analytic method for the purpose of determination of $IAN_{pKa=7}$ shall be a potentiometric titration, where the amount of KOH required to reach the defining $pK_a$ limit is the result, e.g. the determination of $IAN_{pKa=7}$ shall be made by determination of the mg KOH addition per g of sample before pH=7 occurs in titration, similar to the TAN titration to pH=9 or the strong acid SAN titration to pH=4.

The acids with low $pK_a$ in renewable feedstocks commonly comprise carbonyl groups and may include fatty acids and naphthenic acids. In addition, phenols and other alcohols are also present in the renewable feedstocks and some of these, such as substituted phenols and other compounds having a $pK_a$ below 9, will be detected as contributing to TAN, but do not contribute to any significant corrosion.

Accordingly, a renewable feedstock in which carbonyl oxygen has been removed, either as $CO_2$ or as $H_2O$, while other oxygen compounds remain present, will not have significant corrosive effects, but may still have an acid number exceeding that of the ISO-F-RMK-700 specification.

Our experiments investigating corrosivity of different hydrotreated oils have shown that even at high TAN values, corrosion is not detected, but only as long as halogen is not present in the hydrotreated oil. Furthermore, the experiments have shown that for low halogen concentrations may be obtained by mild hydrotreatment, with low hydrogen consumption. Without being bound by theory, we consider the explanation to be that halogen substituted organic acids have a low $pK_a$. As an example acetic acid has a $pK_a$ of 4.76 while fluoro-acetic acid and chloro-acetic acid have a $pK_a$ of 2.66 and 2.81 respectively. Our experiments based on oils produced by thermochemical decomposition.

Therefore, a fuel adhering to a more lenient and specific TAN specification, possibly in combination with requirements to low concentrations of halogens, may be obtained at a significantly lower cost than the equivalent fuel adhering to the strict ISO-F-RMK-700 specification of TAN<2.5 mg KOH/g, without causing an increased risk of corrosion. The fuel may however have a lower energy content, due to the increased content of oxygen, but the cost efficiency may still be above that of a fully treated fuel.

We therefore propose a novel fuel, being a composition comprising, on water free basis, at least 80 wt % molecules comprising from 8 to 35 C-atoms, said composition having a flash point above 60° C. and comprising, on water free basis, 9.5-12 wt % H, 3-45 wt % O and 0.01-5 wt ppm halogens.

Alternatively, we propose a novel fuel, characterized by having a TAN value above 2.5 mg KOH/g, such as above 5 mg KOH/g or above 10 mg KOH/g, while the $IAN_{pKa=X}$, i.e. the contribution to TAN from acids, having a $pK_a$ value below a corrosivity $pK_a$ limit of X is less than 5 mg KOH/kg, 2 mg KOH/kg or 1 mg KOH/kg. The corrosivity $pK_a$ limit may be defined as 7, 6 or alternatively as 5.

The novel fuel may be further characterized by a presence of oxygenates, such that the total amount of O in the fuel is up to 45 wt %, 25 wt %, 10 wt % or 5 wt %, such as 10 wt % to 45 wt %, 5 wt % to 25 wt % or 1 wt % to 10 wt %.

The novel fuel may have a density above that of fossil fuels, such as up to 1300 kg/m³. The density specification in petroleum-based fuels has generally originated from hydrocarbons being lighter than water, but with oxygen rich molecules, the opposite is the case. Therefore, accepting the higher density reduces the requirements for removal of oxygen, at the cost of fuel heating value.

The kinematic viscosity at 50° C. for the novel fuel may also be increased to 850 cSt which is above the limit of ISO-F-RMK-700 which is 700 cSt, as long as the kinematic viscosity at 150° C. is below 15 cSt. For the relevant types of fuel compounds, viscosity will mainly be related to presence of ethers and esters, which only have the negative operational influence of reduced heating value; the viscosity at elevated temperature is important for fuel injection to the engine cylinders, and thus combustion efficiency. The specified flash point of the novel fuel should not be changed, as this is a key parameter for safe storage and handling, and is specified to be above 60° C. However, it is nevertheless indirectly influenced by the specification, since the oxygenates in general have higher flash points than the corresponding hydrocarbons. The light fraction of the feedstock such as octanol complies with the requirement with a flash point of 81° C., while the product of hydrodeoxygenating octanol is octane which has a flash point of 13° C. Similarly, phenol has a flashpoint of 79° C. while benzene has a flashpoint of −12° C. and cyclohexane has a flashpoint of −18° C. Therefore, if octanol or phenol are oxygenated to hydrocarbons, these must be separated from the fuel, to ensuring flashpoint compliance.

By allowing a more lenient specification defining the novel fuel of renewable origin, flexibility for the process generating the bunker fuel will be allowed. One possibility is simply that the required severity of hydrotreatment may be reduced, and accordingly the cost, and the climate impact of the fuel may be reduced by reducing the size of equipment and the hydrogen consumption of hydrotreatment, without significant drawbacks in the operation of the heavy marine engines. The skilled person will be aware how the severity of hydrotreatment may be influenced mainly by increased temperature, space velocity, hydrogen availability (e.g. pressure) and catalyst activity.

It is thus clear that by removing the requirements to marine fuel, which are not of significant benefit in the operation of marine engines, a flexibility in the provision of such fuels is obtained, which may be translated into higher yield, lower hydrogen consumption, lower operational cost and lower capital cost, which again may result in a reduced cost of operation for the marine vessel.

The processes for producing such a novel fuel are similar to the processes practiced known for provision of hydrocarbons from solid hydrocarbonaceous feedstock. Typically, a first section involving thermochemical decomposition of the feedstock to form a liquid hydrocarbonaceous feedstock. This is followed by upgrade of the liquid hydrocarbonaceous feedstock by hydrotreatment.

Liquid products from thermochemical decomposition, such as pyrolysis and hydrothermal liquefaction, have, especially from a global warming perspective, been considered an environmentally friendly replacement for petroleum products, especially after hydrotreatment. The nature of these products (for simplicity pyrolysis oil, irrespective of the originating process) will require upgrading, e.g. by hydrotreatment to remove heteroatoms, such as oxygen and sulfur, and to hydrogenate olefinic structures. The nature of formation means that the products are not stabilized, and therefore, contrary to typical fossil raw feedstocks, they may be very reactive, demanding high amounts of hydrogen, releasing significant amounts of heat during reaction and furthermore having a high propensity towards polymerization. The release of heat may increase the polymerization further, and at elevated temperature catalysts may also be deactivated by coking.

The thermochemical decomposition process plant section providing the hydrocarbonaceous feedstock according to the present disclosure may typically be in the form of equipment facilitating movement of particles and contact between gases and particles such as a rotary oven, fluidized bed, transported bed, or circulating fluid bed, and other mechanical designs as is well known in the art. This decomposition converts a solid hydrocarbonaceous feedstock into a solid (char), a high boiling liquid (tar) and fraction being gaseous at elevated temperatures. The gaseous fraction comprises a fraction condensable at standard temperature (pyrolysis oil or condensate, C5+ compounds) and a non-condensable fraction (pyrolysis gas, including pyrolysis off-gas). For instance, the thermochemical decomposition process plant section (the pyrolysis section) may comprise a pyrolizer unit (pyrolysis reactor), cyclone(s) to remove particulate solids such as char, and a cooling unit for thereby producing pyrolysis off-gas stream and said pyrolysis oil stream, i.e. condensed pyrolysis oil. The pyrolysis gas stream comprises light hydrocarbons e.g. C1-C4 hydrocarbons, $H_2O$, $CO$ and $CO_2$. Typically, the term pyrolysis oil stream comprises condensate and tar, and the pyrolysis oil stream from pyrolysis of biomass may also be referred to as bio-oil or bio-crude and is a liquid substance rich in blends of molecules, usually consisting of more than two hundred different compounds mainly oxygenates such as acids, sugars, alcohols, phenols, guaiacols, syringols, aldehydes, ketones, furans, and other mixed oxygenates, resulting from the depolymerization of the solids treated in pyrolysis.

For the purposes of the present invention, the thermochemical decomposition section may be fast pyrolysis, also referred to in the art as flash pyrolysis. Fast pyrolysis means the thermochemical decomposition of a solid hydrocarbonaceous feedstock typically in the absence of oxygen, at temperatures typically in the range 350-650° C. e.g. about 500° C. and reaction times of 10 seconds or less, such as 5 seconds or less, e.g. about 2 sec. Fast pyrolysis may for instance be conducted by autothermal operation e.g. in a fluidized bed reactor. The latter is also referred to as autothermal pyrolysis and is characterized by employing air, optionally with an inert gas or recycle gas, as the fluidizing gas. Thereby, the partial oxidation of pyrolysis compounds being produced in the pyrolysis reactor (autothermal reactor) provides the energy for pyrolysis while at the same time improving heat transfer. In so-called catalytic fast pyrolysis, a catalyst may be used. An acid catalyst (commonly comprising a zeolite, without metals) may be used to upgrade the pyrolysis vapors, and it can both be operated in an in-situ mode (the catalyst is located in the pyrolysis reactor) and an ex-situ mode (the catalyst is placed in a separate reactor). The use of a catalyst conveys the advantage of removing oxygen and thereby helping to stabilize the pyrolysis oil, thus making it easier to hydroprocess. In addition, increased selectivity towards desired pyrolysis oil compounds may be achieved.

In some cases, hydrogen is added to the catalytic pyrolysis which is called reactive catalytic fast pyrolysis. If the catalytic pyrolysis is conducted at a high hydrogen pressure, such as above 0.5 MPa, it is often called catalytic hydropyrolysis.

The pyrolysis stage may be fast pyrolysis which is conducted without the presence of a catalyst and hydrogen, i.e. the fast pyrolysis stage is not catalytic fast pyrolysis, hydropyrolysis or catalytic hydropyrolysis. This enables a simpler process having a lower cost.

The thermochemical decomposition section may also be hydrothermal liquefaction. Hydrothermal liquefaction means the thermochemical conversion of solid waste and biomass into liquid fuels by processing in a hot, pressurized water environment for sufficient time to break down the solid polymeric structure to mainly liquid components. Typical hydrothermal processing conditions are temperatures in the range of 250-375° C. and operating pressures in the range of 4-45 MPa. This technology offers the advantage of operation of a lower temperature, higher energy efficiency and producing a product with higher stability and a lower oxygen content compared to pyrolysis, e.g. fast pyrolysis.

Finally, other relevant thermochemical decomposition methods are intermediate or slow pyrolysis, in which the conditions involve a lower temperature and commonly higher residence times—these methods may also be known as carbonization or torrefaction. The major benefit of these thermochemical decomposition methods is a lower investment, but they may also have specific benefits for specific feedstocks or for specific product requirements, such a need for bio-char.

The conversion of a hydrocarbonaceous feedstock comprising oxygenates to hydrocarbons is a common process for production of renewable transportation fuels from oils and fats, but the reactivity and other specifics differ for different feedstocks. The liquid hydrocarbonaceous feedstock may originate from thermochemical decomposition of non-biological waste such as plastic and rubber fractions, including end of life tires, as well as from biological materials rich in lignin, such as straw and waste from wood processing as well as non-biological waste comprising suitable compositions, such as plastic fractions or rubber, including used tires, typically after a thermal and/or catalytic degradation process. When the feedstock is of biological origin, the feedstock and the product will be characterized by having a $^{14}C$ content above 0.5 parts per trillion of the total carbon content, but when the feedstock includes waste of fossil origin, such as plastic, this ratio may be different.

The production of hydrocarbon products typically will require at least partial hydrotreatment for removing an amount of heteroatoms and saturating double bonds. During hydrotreatment, the hydrocarbonaceous feedstock is combined with an excess of hydrogen and react in hydrotreatment processes, where water is released from the oxygenates. If the oxygenates involve carbonyl groups, decarboxylation and decarbonylation processes releasing carbon dioxide and carbon monoxide may also take place, and in that case an amount of carbon dioxide is converted to carbon monoxide by the water/gas shift process, but this is less common in the types of cyclic hydrocarbonaceous feedstock according to the present disclosure. For pyrolysis oil originating from rubber and plastic, the oxygen content will be low, such as 0.5 wt %, whereas for pyrolysis oil from ligneous compounds it will be higher, such as, from 5 wt %, 10 wt % or even 25 wt % to 50 wt % of the oxygenate feedstock is oxygen, and thus if full conversion is desired, a significant amount of the product stream will be water, carbon dioxide and carbon monoxide. In addition, an amount of light hydrocarbons may also be present in the product stream, depending on the nature of the feedstock and the side reactions occurring. Hydrotreatment may also involve extraction of other hetero-atoms, notably nitrogen and sulfur but possibly also halogens and silicon as well as saturation of double bonds. Especially the hydrotreatment of oxygenates is very reactive and exothermal, and moderate or low activity catalysts may be preferred to avoid excessive heat release and runaway reactions resulting in coke formation deactivating the catalyst. The catalyst activity is commonly controlled by only using low amounts of active metals and especially limiting the amount of promoting metals, such as nickel and cobalt.

Typically, the hydrotreatment, catalyst comprises sulfided molybdenum, or possibly tungsten, and/or nickel or cobalt, supported on a carrier comprising one or more refractory oxides, typically alumina, but possibly silica or titania. The support is typically amorphous. The catalyst may comprise further components, such as boron or phosphorous. The conditions are typically a temperature in the interval 250-400° C., a pressure in the interval 3-15 MPa, and a liquid hourly space velocity (LHSV) in the interval 0.1-2 $hr^{-1}$. The deoxygenation will involve a combination of hydrodeoxygenation producing water and if the oxygenates comprise carboxylic groups such as acids or esters, decarboxylation producing $CO_2$. The deoxygenation of carboxylic groups, if present, may proceed by hydrodeoxygenation or decarboxylation with a selectivity which, depending on conditions and the nature of the catalyst may vary from above 90% hydrodeoxygenation to above 90% decarboxylation. Deoxygenation by both routes is exothermal, and with the presence of a high amount of oxygen, the process may involve intermediate cooling e.g. by quenching with cold hydrogen, feed or product. The feedstock may preferably contain an amount of sulfur to maintain sulfidation of the metals, in order to maintain their activity. If the feedstock stream comprising oxygenates comprises less than 10, 100 or 500 $ppm_w$ sulfur, a sulfide donor, such as dimethyldisulfide (DMDS) has typically been added to the feed.

If the unstabilized feedstock is highly reactive, a pre-treatment at moderate conditions may be relevant, to stabilize the feedstock. This may involve an inlet temperature as low as 80° C., 120° C. or 200° C., a pressure in the interval 3-15 MPa, and a liquid hourly space velocity (LHSV) in the interval 0.1-2 $hr^{-1}$ and a deliberate choice of less active catalyst, such as unpromoted molybdenum. Due to the reactive components and the exothermal nature thermal control may be relevant in this pre-treatment step.

In the production of the fuel according to the present disclosure, the conversion may be deliberately limited by the combination of LHSV, the temperature possibly by controlling the amount or temperature of recycle, the catalyst activity and the amount of hydrogen present, in a manner limiting conversion to the extent desired. The amount of hydrogen must be above the amount required, to minimize the risk of deposition of carbon on catalyst surfaces.

Advantageous Effects of Invention

A first aspect of the present disclosure relates to a composition e.g. a marine fuel component comprising, on water free basis, at least 80 wt % molecules comprising from 8 to 35 C-atoms, said composition having a flash point above 60° C. and comprising, on water free basis, 9.5-12 wt % H, 3-45 wt % O and 0.01-5 wt ppm halogens.

In further aspects the composition comprises at least 90 wt % or at least 95 wt % molecules comprising from 8 to 35 C-atoms. The composition may comprise up to 99 wt % or even 100 wt % molecules comprising from 8 to 35 C-atoms, with the associated benefit of a composition comprising such molecules having viscosity and other properties suitable for use in marine engines and the related logistics.

In further aspects the composition has a flash point above 60° C. and below 200° C. This has the associated benefit of being safe to handle and still sufficiently reactive for use as a fuel.

In further aspects the composition comprises at least 9.5 wt %, 10 wt % or 11 wt % H and less than 12 wt % H. This has the associated benefit of characterizing a composition originating from thermochemical decomposition with some but limited hydrotreatment.

In further aspects the composition comprises at least 3 wt %, 10 wt % or 25 wt % O and up to 30 wt % or 45 wt % O. This has the associated benefit of characterizing a composition originating from thermochemical decomposition with limited hydrotreatment.

In further aspects the composition comprises less than 1 $ppm_{wt}$, 2 $ppm_{wt}$ or 5 $ppm_{wt}$ halogens. This has the associated benefit of characterizing a composition originating from thermochemical decomposition with sufficient hydrotreatment to release organically bound halogens to a level where corrosion is negligible. In some aspects the amount of halogens may be as low as 0 $ppb_{wt}$ (i.e. undetectable), in other aspects the amount of halogens may be above 1 $ppb_{wt}$, 10 $ppb_{wt}$ or 50 $ppb_{wt}$, which are levels sufficiently low for minimizing corrosion but allowing for a cost effective process with a minor residual of halogens. The distribution of halogens in the composition may be dominated by chloride, but also fluoride, bromide and iodine may be present, depending on the source of the composition. For each halogen the fraction of all halogens may be from 0 wt % to 100 wt %. Chloride may commonly be from 50 wt % to 90 wt % of the halogens, whereas fluoride, bromide and iodine more commonly may be present as 10 wt % to 50 wt % of the halogens each.

Collectively this has the associated benefit of being a composition suitable as a fuel component originating from renewable sources which is produced with minimal processing and thus inexpensive, but still fulfilling critical requirements.

A further aspect relates to a composition according to the first aspect, having a total acidity number measured according to ASTM D664 being above 15 mg KOH/g, above 25 mg KOH/g or above 50 mg KOH/g. Commonly the total acidity number would be below 200 mg KOH/g or 500 mg KOH/g.

This has the associated benefit of being a composition suitable as a fuel component originating from renewable sources which is produced with minimal processing and thus inexpensive, but still fulfilling critical requirements.

A third aspect relates to a composition according to any aspect above, having an intermediate acidity number measured according to NREL/TP-5100-65890.

This has the associated benefit of being an inexpensive fuel component with minimal requirements to engine material quality. The analytical method may also be defined by titration at an inflection point of $pK_a=7$, $pK_a=6$ or $pK_a=5$ which could require moderate although not excessive increases in material quality requirements.

A fourth aspect relates to a composition according to any aspect above, having a viscosity at 50° C. below 850 mm²/s.

This has the associated benefit of being an inexpensive fuel component with minimal requirements to viscosity, defined by routine analytical methods. The requirements for viscosity could alternatively be defined by the viscosity at 150° C. being below 15 mm²/s, but in practice viscosity measurement at the conditions of current standard methods are more convenient in practice, and correlations for the types of products confirm the relevance of the limit at 50° C.

A fifth aspect relates to a composition according to any aspect above, having a density at 15° C. of 870 kg/m³ to 1300 kg/m³.

This has the associated benefit of providing a fuel without excessive requirements, which is predictable and useful in practice.

A sixth aspect relates to a composition according to any aspect above, having a strong acid number below 0.1 mg KOH/g. This has the associated benefit of ensuring that a more lenient acidity specification does not result in an increased corrosion risk due to presence of highly corrosive strong acids.

A seventh aspect relates to a composition according to any aspect above, comprising less than 10 wt %, 5 wt % water or 1 wt % water.

This has the associated benefit of being an inexpensive marine fuel component allowing presence of a moderate amount of water, without jeopardizing combustion qualities. The fuel may contain as little water as 0 $ppm_{wt}$, 100 $ppm_{wt}$ or 1000 $ppm_{wt}$.

An eighth aspect relates to a composition according to any aspect above comprising at least 1 wt % phenols.

This has the associated benefit of such a fuel would typically originate from a thermochemical conversion, and thus would use an inexpensive solid feedstock, which is upgraded at minimal cost.

An ninth aspect relates to a composition, according to any aspect above characterized in that the product has a 14C isotope content above 0.5 $ppt_{wt}$ of the total carbon content.

An tenth aspect relates to a marine fuel, comprising at least 10 wt % of the marine fuel component according to any aspect above.

This has the associated benefit of providing a marine fuel with reduced environmental load, while maintaining the flexibility of partial sourcing of marine fuel from fossil sources.

A further aspect relates to the use of a composition or a marine fuel according to any aspect above as fuel in a marine engine.

This has the associated benefit of cost-effectively operating a marine engine with reduced environmental and climate load.

A further aspect relates to a process for production of a marine fuel component according to any aspect above involving the step of directing a renewable liquid hydrocarbonaceous feedstock comprising at least 5 wt % oxygen in oxygenates to contact a hydrotreatment catalyst under conditions affecting from 10% to 90% conversion of oxygen in oxygenates to water and carbon dioxide. The process may involve less than 30%, less than 50% or less than 70% conversion, and the extent of conversion may be determined by the criteria of bringing the amount of halogens below.

This has the associated benefit of providing a process for cost efficient production of a marine fuel component, which in practical use is close to equivalent with fossil marine fuel.

A tenth aspect relates to a process according to any aspect above wherein the hydrocarbonaceous feedstock is the product of a thermochemical decomposition process.

This has the associated benefit of providing a process which can provide hydrocarbonaceous feedstock and thus marine fuel component at low cost.

An alternative aspect disclosed relates to a composition e.g. a marine fuel component made from a hydrocarbonaceous feedstock, comprising less than 10 wt % water and having a flash point above 60° C., characterized in the oxygen content being from 1 wt % to 45 wt % and a total acidity number according to ASTM D664 being above 5 mg KOH/g.

This has the associated benefit of being a fuel component originating from renewable sources which is produced with minimal processing and thus inexpensive, but still fulfilling critical requirements.

EXAMPLE 1

Based on process modelling, obtaining different qualities of fuel from a liquid hydrocarbonaceous feedstock originating from thermochemical decomposition is evaluated in Table 1. A feedstock comprising 11.2 wt % O with a TAN of 57 mg KOH/g was converted partially with 68% hydrodeoxygenation and with complete hydrodeoxygenation.

The partial hydrotreatment involves 68% removal of oxygen from 11 wt % to 4 wt %. As carboxylic acids are most reactive, these are more easily removed, up to a level of 98%, while other oxygenates are only removed 25%.

The fresh liquid hydrocarbonaceous feedstock would be unsuited for use as a marine fuel. The shortcomings include too low flashpoint at 50° C., too high corrosiveness, in that the intermediate acidity number ($IAN_{pKa}=7$) is 30 mg KOH/g and too high viscosity at 40° C. as well as at 150° C.

For the product from partial hydrotreatment, fractionation at 145° C. provides a product which fulfills the requirements for the new fuel, with a yield of 88.46 wt % relative to fresh feedstock. The product has a low corrosiveness, an acceptable viscosity—and the fractionation removing 2.7 wt % as gases and a 1% as a light naphtha fraction, leaves 88.46 wt % of the fresh feed, with a flash point of 60° C. The heat release for the hydrodeoxygenation is sufficiently low, such that it is not required to dilute the feedstock with cooled recycle, to provide a heat sink.

For the product from full hydrotreatment, fractionation at 145° C. provides a product which fulfills the requirements for the new fuel, with a yield of 84.4 wt % relative to fresh feedstock, which also has a low corrosiveness and an acceptable viscosity—but the fractionation removes 4.17 wt % as gases and 2.5 wt % as a light naphtha fraction, leaving 84.4 wt % of the fresh feed, with a flash point of 60° C. The hydrogen consumption is increased from 0.8 wt % of fresh feed to 4.0 wt %, and with that the heat release for the hydrotreatment, such that it is required to dilute the feedstock with 1.5:1 cooled recycle:fresh feed, to provide a heat sink. The recycle volume results in a close to proportional increase in heat exchanger size, as well as a significantly increased reactor volume, and thus increased cost.

The example illustrate that the novel fuel may be provided in increased yield and reduced cost without sacrificing operational quality for a heavy marine engine, if hydrotreatment is only partial. The full hydrotreatment is associated with a loss in yield, which is almost equivalent to the gain in higher heating value (HHV). In addition there is an operational cost related the additional hydrotreatment process.

The capital cost will be significantly lower, from avoiding recycling circuit and equipment, and even more from avoiding the extra reactor and catalyst volume required.

Furthermore, the operational cost will also be reduced. The consumption of hydrogen is lowered by a factor 5 and the energy for recycle is avoided.

EXAMPLE 2

A feedstock from pyrolysis of X was hydrotreated at 2 levels, as illustrated in Table 2. The severity of hydrotreatment is indicated by the HDO extent in %, i.e. the amount of organically bound oxygen released, and this severity is controlled by temperature, space velocity and pressure in combination as illustrated.

At a HDO conversion of 45%, 94% of the organically bound halogens are removed, 81% of the carboxylic acids (CAN) removed and 55% of the substances detected by TAN removed. This shows that the organically bound halogen and the stronger acids are all more easily removed, compared to the average oxygen in the biocrude. It is also worth noting that SAN was observed to 0 mg KOH/g for all samples.

Furthermore, the test shows that the marine fuel yield is higher at less severe hydrotreatment, as only 0.39 wt % C1 to C4 and 2.26 wt % naphtha is produced at 45% HDO, compared to 3.64 wt % C1 to C4 and 4.25 wt % naphtha at 78% HDO. If the hydrotreatment severity was increased to complete oxygen removal even higher yield loss is expected, and furthermore the hydrogen consumption is also expected to increase.

EXAMPLE 3

In order to study the corrosivity of the feed and products, a piece of carbon steel was placed in the samples and heated to 100° C. and corrosion was measured based on the change in metal weight. A high change in metal weight indicates a high corrosion rate.

According to this test only sample 1—the feedstock from pyrolysis of X—showed any corrosion, with a loss of 0.04 wt % after 16 days and 0.29 wt % after 42 days. The two partially hydrotreated samples did not show detectable corrosion in this test.

This result shows that as little as 45% HDO is sufficient to minimize corrosivity of a feedstock, even if the TAN is as high as 49 mg KOH/g and CAN is 12.5 mg KOH/g.

TABLE 1

| HDO | | Feed | 68% | 100% |
|---|---|---|---|---|
| TAN | | 57 | 9 | 0 |
| IAN$_{pKa=7}$ | | 30 | 2 | 0 |
| C % | wt % | | | |
| H % | wt % | | | |
| O % | wt % | 11.2 | 4 | 0 |
| O % in oxygenated aromatics | wt % | 6.0 | 3.5 | 0 |
| Viscosity at 40° C. | cSt | 1610 | 590 | 5 |
| SG | | 1.0625 | 1.0023 | 0.927 |
| HHV | MJ/kg | 38 | 42 | 45 |
| Flash point | ° C. | 60 | 60 | 60 |
| H2 consumption, make-up in unit | wt % FF | | 0.8 | 4.0 |
| Yield marine fuel | wt % FF | | 88.46 | 84.4 |
| Yield C1-C5 | wt % FF | | 2.72 | 4.17 |
| Yield naphtha | wt % FF | | 1 | 2.5 |
| Recycle | wt % FF | | 0 | 150 |
| LHSV | hr$^{-1}$ | | 0.5 | 0.2 |

TABLE 2

| | | Sample | | |
|---|---|---|---|---|
| | | 1 | 2 | 3 |
| HDO conversion | | Feed (0%) | 45% | 78% |
| TAN (D664) | mg KOH/g | 108.5 | 49 | 1.5 |
| CAN (NREL) | mg KOH/g | 65 | 12.5 | 0 |
| SAN | mg KOH/g | 0 | 0 | 0 |
| Cl | wt ppm | 12 | 0.6 | 0.2 |
| F | wt ppm | 5.2 | 0.4 | 0.4 |
| H % | wt % | 8.96 | 9.87 | 10.57 |
| O % | wt % | 8.3 | 4.6 | 1.8 |
| Viscosity at 40° C. | cSt | 2136 | 206 | 16 |
| SG | | 1.0600 | 1.0065 | 0.9633 |
| H2 consumption | wt % FF | | 1.09 | 2.25 |
| Yield marine fuel | wt % FF | | 93.92 | 86.61 |
| Yield C1-C4 | wt % FF | | 0.39 | 3.64 |
| Yield naphtha | wt % FF | | 2.26 | 4.25 |
| Pressure | | | 100 | 120 |
| Temperature | | | 320 | 400 |
| LHSV | hr$^{-1}$ | | 0.5 | 0.29 |

The invention claimed is:

1. A composition comprising, on a water free basis, at least 80 wt % molecules having from 8 to 35 C-atoms, said composition having a flash point above 60° C. and comprising, on a water free basis, 9.5-12 wt % H, 3-45 wt % O and less than 5 wt ppm halogens,
   said composition having total acidity number above 15 mg KOH/g.

2. A composition according to claim 1, having a viscosity at 50° C. below 850 mm$^2$/s.

3. A composition according to claim 1, having a density at 15° C. of 870 kg/m$^3$ to 1300 kg/m$^3$.

4. A composition according to claim 1, having a strong acid number measured by KOH titration at the inflection point of pKa=4 below 0.1 mg KOH/g.

5. A composition according to claim 1, comprising less than 5 wt % water.

6. A composition according to claim 1, comprising at least 1 wt % phenols.

7. A composition according to claim 1, wherein the product has a $^{14}C$ isotope content above 0.5 pptwt of the total carbon content.

8. A marine fuel comprising at least 10 wt % of the composition according to claim 1.

9. A method of using a composition according to claim 1 as fuel in a marine engine, comprising a step of supplying the composition according to claim 1 to the marine engine.

10. A composition comprising, on a water free basis, at least 80 wt % molecules having from 8 to 35 C-atoms, said composition having a flash point above 60° C. and comprising, on a water free basis, 9.5-12 wt % H, 3-45 wt % O and less than 5 wt ppm halogens, said composition having a carboxylic acidity number measured according to NREL/TP-5100-65890 being below 2.5 mg KOH/g.

11. A composition according to claim 10, having a viscosity at 50° C. below 850 mm$^2$/s.

12. A composition according to claim 10, having a density at 15° C. of 870 kg/m$^3$ to 1300 kg/m$^3$.

13. A composition according to claim 10, having a strong acid number measured by KOH titration at the inflection point of pKa=4 below 0.1 mg KOH/g.

14. A composition according to claim 10, comprising less than 5 wt % water.

15. A composition according to claim 10, comprising at least 1 wt % phenols.

16. A composition according to claim 10, wherein the product has a 14C isotope content above 0.5 pptwt of the total carbon content.

17. A marine fuel comprising at least 10 wt % of the composition according to claim 10.

18. A method of using a composition according to claim 10 as fuel in a marine engine, comprising a step of supplying the composition according to claim 3 to the marine engine.

19. A process for production of a composition comprising, on a water free basis, at least 80 wt % molecules having from 8 to 35 C-atoms, said composition having a flash point above 60° C. and comprising, on a water free basis, 9.5-12 wt % H, 3-45 wt % O and less than 5 wt ppm halogens, said process involving the step of directing a renewable liquid hydrocarbonaceous feedstock comprising at least 5 wt % oxygen in oxygenates to contact a hydrotreatment catalyst under conditions affecting from 10% to 90% conversion of oxygen in oxygenates to water, carbon dioxide and/or carbon monoxide.

20. A process according to claim 19 wherein the hydrocarbonaceous feedstock is the product of a thermochemical decomposition process.

* * * * *